(12) United States Patent
Reyes et al.

(10) Patent No.: US 10,481,823 B2
(45) Date of Patent: Nov. 19, 2019

(54) DATA STORAGE SYSTEM PERFORMING DATA RELOCATION BASED ON TEMPORAL PROXIMITY OF ACCESSES

(71) Applicant: INTERNATIONAL BUSINESS MACHINES CORPORATION, Armonk, NY (US)

(72) Inventors: Sergio Reyes, Austin, TX (US); Brian C. Twichell, Austin, TX (US); Yijie Zhang, Tucson, AZ (US); Samuel K. Ingram, Fort Bend, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/901,549

(22) Filed: Feb. 21, 2018

(65) Prior Publication Data

US 2019/0258421 A1  Aug. 22, 2019

(51) Int. Cl.
  *G06F 12/00*  (2006.01)
  *G06F 3/06*  (2006.01)

(52) U.S. Cl.
  CPC .......... *G06F 3/0647* (2013.01); *G06F 3/0611* (2013.01); *G06F 3/0689* (2013.01)

(58) Field of Classification Search
  None
  See application file for complete search history.

(56) References Cited

U.S. PATENT DOCUMENTS

| 5,426,736 A | 6/1995 | Guineau, III |
| 6,820,171 B1 | 11/2004 | Weber et al. |

(Continued)

FOREIGN PATENT DOCUMENTS

| CN | 1696913 A | 11/2005 |
| CN | 102073375 A | 5/2011 |

(Continued)

OTHER PUBLICATIONS

"Basics of Disk I/O Performance", Fujitsu Technology Solutions, 2011 (see p. 11). https://sp.ts.fujitsu.com/dmsp/Publications/public/wp-basics-of-disk-io-performance-ww-en-pdf.
International Business Machines Corporation et al., International application No. PCT/IB2019/050696, International filing date Jan. 29, 2019, International Search Report and Written Opinion dated May 28, 2019.

*Primary Examiner* — Jason W Blust
(74) *Attorney, Agent, or Firm* — Brian F. Russell; Wenjie Li

(57) ABSTRACT

A data storage system includes first and second storage devices accessed via first and second hardware channels, respectively. A storage controller receives a first access request requesting access to first data and a second access request requesting access to second data, where both the first data and the second data are accessed via the first hardware channel. In response to detecting receipt of the first and second access requests within a same service window defining a range of temporal proximity, the storage controller records an association of identifiers of the first data and second data requested by the first and second access requests, respectively. The storage controller thereafter migrates the second data accessed by the second access request from the first storage device to the second storage device based on the recorded association, such that the first and second data are available for access via different hardware channels.

16 Claims, 4 Drawing Sheets

(56) References Cited

U.S. PATENT DOCUMENTS

| | | | |
|---|---|---|---|
| 7,512,888 | B2 | 3/2009 | Sugino et al. |
| 7,546,601 | B2 | 6/2009 | Byrd et al. |
| 8,036,117 | B1 | 10/2011 | Sindhu et al. |
| 9,229,657 | B1 | 1/2016 | Rus et al. |
| 9,626,129 | B2 | 4/2017 | Nakajima et al. |
| 2006/0036579 | A1 | 2/2006 | Byrd et al. |
| 2010/0293348 | A1* | 11/2010 | Ye ................ G06F 3/0613 711/157 |

FOREIGN PATENT DOCUMENTS

| | | |
|---|---|---|
| CN | 105549904 A | 5/2016 |
| CN | 105940386 A | 9/2016 |
| CN | 106453571 A | 2/2017 |
| EP | 2458789 A1 | 5/2012 |

\* cited by examiner

| Access Data Structure 300 | | |
|---|---|---|
| Extent pair 304 | Count 306 | Candidate device 308 |
| E1:E2 | 1 | B |
| E1:E3 | 1 | C |
| E1:E4 | 1 | D |
| E1:E5 | 1 | - |
| E2:E3 | 1 | C |
| E2:E4 | 1 | D |
| E2:E5 | 1 | - |
| E3:E4 | 1 | D |
| E3:E5 | 1 | - |
| E4:E5 | 1 | - |
| ... | ... | ... |

Controller memory 125

Fig. 3

DATA STORAGE SYSTEM PERFORMING DATA RELOCATION BASED ON TEMPORAL PROXIMITY OF ACCESSES

BACKGROUND OF THE INVENTION

This disclosure relates to data processing and data storage, and more specifically, to the efficient distribution of data among the storage devices of a data storage system. Still more particularly, the disclosure relates to relocating data between data storage devices based on the temporal proximity of accesses to the data.

Data storage systems commonly attempt to reduce access latency and increase input/output (I/O) throughput by reducing access bottlenecks. For example, in some implementations, data storage systems attempt to improve access latency and increase throughput by distributing data "horizontally" among multiple different peer storage devices forming a storage array (e.g., a Redundant Array of Independent Disks (RAID)). In some implementations, data storage system alternatively or additionally attempt to improve access latency and increase throughput by "vertically" distributing data among multiple tiers of storage devices having differing access latencies based on the frequency of access to the data.

The present disclosure recognizes, however, that even in data storage systems that distribute data "horizontally" and/or "vertically," performance bottlenecks can still arise due to the temporal proximity of accesses to different data residing on the same storage device or accessed via a common controller.

BRIEF SUMMARY

The present disclosure ameliorates performance bottlenecks that can arise due to the temporal proximity of accesses to data residing on the same storage device and/or subject to access via a common controller.

In at least one embodiment, a data storage system includes at least first and second storage devices accessed via first and second hardware channels, respectively. A storage controller of the data storage system receives a first access request requesting access to first data and a second access request requesting access to second data, where both the first data and the second data are accessed via the first hardware channel. In response to detecting receipt of the first and second access requests within a same service window defining a range of temporal proximity, the storage controller records an association of identifiers of the first data and second data requested by the first and second access requests, respectively. The storage controller thereafter migrates the second data accessed by the second access request from the first storage device to the second storage device based on the recorded association, such that the first and second data are available for access via different hardware channels.

BRIEF DESCRIPTION OF THE SEVERAL VIEWS OF THE DRAWINGS

FIG. 3 illustrates an exemplary access data structure in which targets of temporally proximate access requests are recorded by the process of FIG. 2 in accordance with one embodiment.

DETAILED DESCRIPTION

Figure 1:
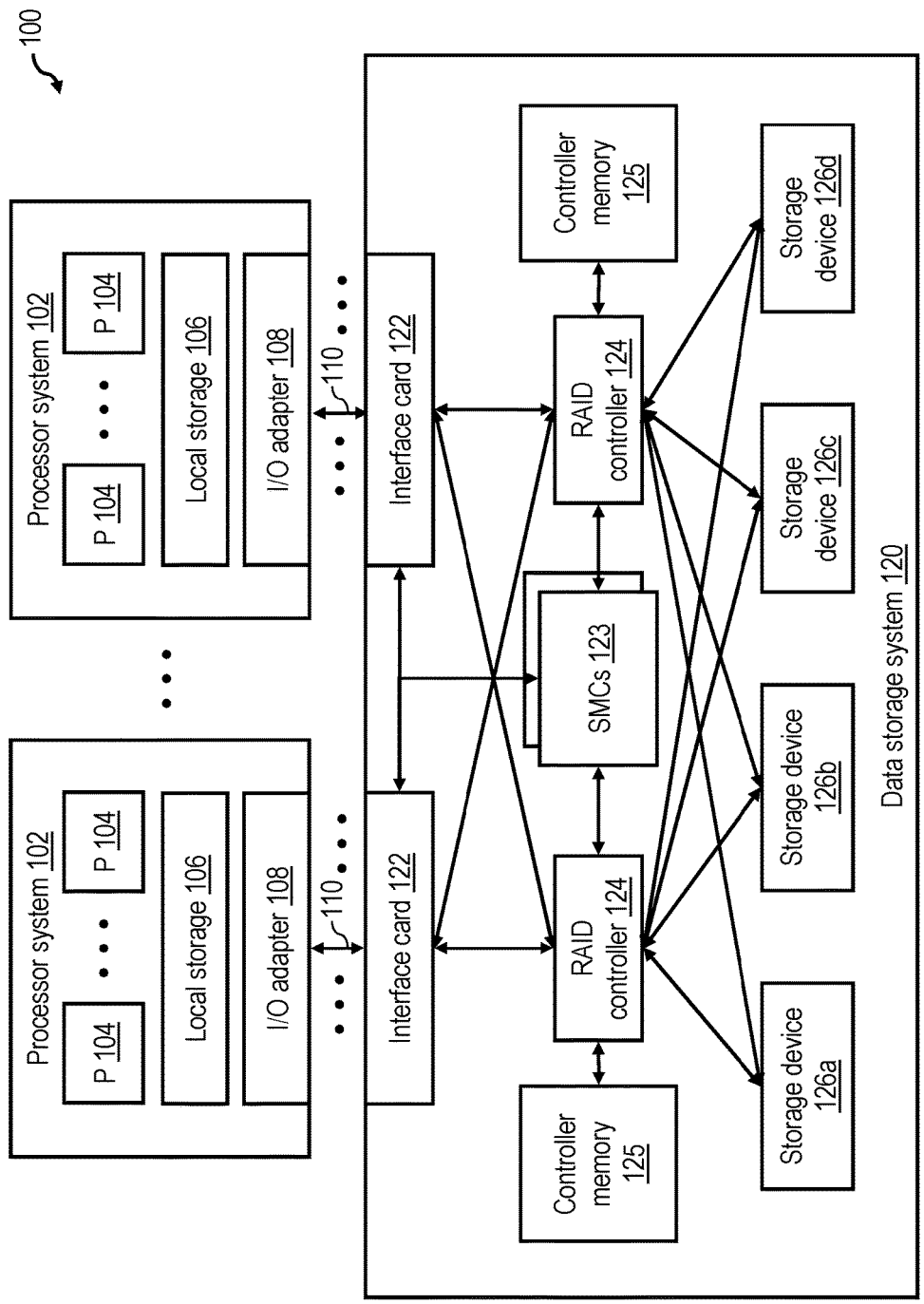
FIG. 1 is a high level block diagram of a data processing environment in accordance with one embodiment.

With reference now to the figures and with particular reference to FIG. 1, there is illustrated a high level block diagram of an exemplary data processing environment 100 including a data storage system 120 as described further herein. As shown, data processing environment 100 includes one or more hosts, such as a processor system 102 having one or more processors 104 that process instructions and data. A processor system 102 may additionally include local storage 106 (e.g., dynamic random access memory (DRAM) or disks) that may store program code, operands, and/or execution results of the processing performed by processor(s) 104. In various embodiments, a processor system 102 can be, for example, a mobile computing device (such as a smartphone or tablet), a laptop or desktop personal computer system, a server computer system (such as one of the POWER series of servers available from International Business Machines Corporation), or a mainframe computer system. A processor system 102 can also be an embedded processor system using various processors such as ARM, POWER, Intel x86, or any other processor combined with memory caches, memory controllers, local storage, I/O bus hubs, etc.

Each processor system 102 further includes one or more input/output (I/O) adapters 108, which each can be coupled directly (i.e., without any intervening device) or indirectly (i.e., through at least one intermediate device) to one or more data storage systems 120 via an I/O channel 110. In some embodiments, a data storage system 120 may be integral to a processor system 102. In various embodiments, I/O channel 110 may employ any one or a combination of known or future developed communication protocols, including, for example, Fibre Channel (FC), FC over Ethernet (FCoE), Internet Small Computer System Interface (iSCSI), InfiniBand, Transport Control Protocol/Internet Protocol (TCP/IP), Peripheral Component Interconnect Express (PCIe), etc. I/O requests (operations) communicated via I/O channel 110 include, for example, read requests by which a processor system 102 requests data from data storage system 120, write requests by which a processor system 102 requests storage of data in data storage system 120, and open request by which a processor system 102 requests that a file system object (e.g., a file) be opened.

In the illustrated embodiment, data storage system 120 includes one or more interface cards 122 through which data storage system 120 receives and responds to I/O requests of hosts via I/O channels 110. Each interface card 122 is coupled to one or more Redundant Array of Inexpensive Disks (RAID) controllers 124, which provide fault tolerance and load balancing. Each of RAID controllers 124 is in turn coupled (e.g., by a PCIe bus) to one or more non-volatile storage devices 126a-126d, which can include one or more types of storage devices, including non-volatile memory (e.g., flash memory), hard disks, tape drives, etc. Each of RAID controllers 124, which preferably is coupled to or includes a respective controller memory 125, distributes extents of file system objects among storage devices 126 in order to achieve good I/O throughput and low latency.

In the depicted embodiment, the overall operation of data storage system 120 is managed by redundant system management controllers (SMCs) 123, which are coupled to interface cards 122 and RAID controllers 124. In various embodiments, system management controller 123 can be implemented utilizing hardware or hardware executing firmware and/or software.

Those skilled in the art will readily appreciate upon reference to FIG. 1 that data processing environment 100 includes multiple hardware channels that may potentially form bottlenecks for data access requests due to the inherent latencies and throughput limitations of those hardware channels. In general, in the given example, these multiple hardware channels can include at least I/O adapter 108, interface card 122, RAID controller 124, and storage devices 126. The inherent latencies and throughput limitations of these hardware channels have the effect of serializing temporally proximate access requests employing a common set of hardware channels such that the later received access request can be serviced at a latency equal to the inherent latencies of all the hardware channels traversed by the access request plus any wait times imposed by queuing delays as the access request waits for the immediately previous access request to complete. In general, for data storage systems 120 including storage devices 126 like hard disks and tape drives, the largest contributor to the latency of an access request will be the seek time of the storage device 126, which can be, for example, 2 to 10 ms.

Figure 2:
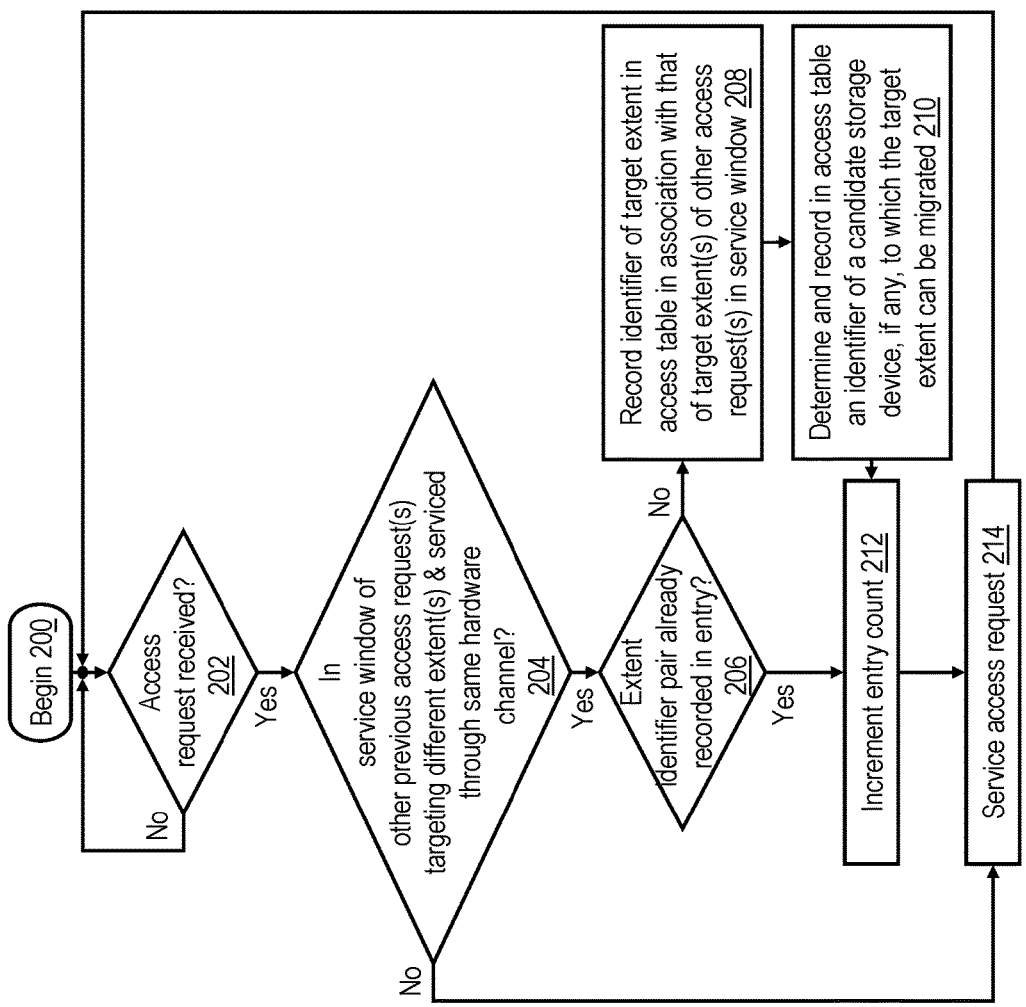
FIG. 2 is a high level logical flowchart of an exemplary process for recording targets of temporally proximate accesses in accordance with one embodiment.

Referring now to FIG. 2, there is depicted a high level logical flowchart of an exemplary process for recording targets of temporally proximate access requests in accordance with one embodiment. The illustrated process can be performed, for example, by a RAID controller 124 and/or a SMC 123 in various embodiments (which can individually or collectively be referred to as a "storage controller"), in the following description the process will be described as being performed by a RAID controller 124 for ease of description. In various embodiments, the illustrated process can be implemented entirely in hardware or on a hardware platform configured to perform the process through the execution of firmware and/or software.

The process of FIG. 2 begins at block 200 and then proceeds to block 202, which illustrates a RAID controller 124 awaiting receipt of an access request, for example, a read request, write request, or open request. The access request typically identifies the initiator of the request (e.g., by an Internet Protocol (IP) address, Media Access Control (MAC) address, or other identifier of the processor system 102 and/or workload that initiated the access request) and specifies a target file system object to be accessed by the request. Depending on the configuration of data storage system 120, the target file system object may be presented to the initiator via a logical interface, such as a storage volume including one or more logical units (LUNs). Regardless of how the target file system object is presented to the initiator, the target file system object is physically stored within one or more storage devices 126 in one or more extents, each of which is formed of one or more contiguous blocks of physical storage.

If no access request is received at block 202, the process continues to iterate until RAID controller 124 receives an access request. In response to receipt of an access request, RAID controller 124 determines at block 204 whether or not the access request is received within a service window of one or more other previous access requests that target different extent(s) and are serviced through the same hardware channel. In a preferred embodiment, the service window of a hardware channel is a configurable duration defining a range of temporal proximity of access requests. For example, in some embodiments, the service window of a hardware channel may be configured automatically by an operating system or storage system software or, alternatively or additionally, manually by a storage administrator. In the case of data storage systems 120 including storage devices 126 having a latency that is subject to a seek time (e.g., hard disks, tape drives, etc.), the service window for a given hardware channel preferably has a minimum value equal to the seek time of the underlying storage device 126. Thus, if an access request requests access to one or more extents that are stored on a hard disk storage device 126 having a seek time of 2 ms, the service window for accesses serviced from that hard disk storage device may be configured, for example, to be between 2 to 5 ms. Accordingly, if the service window for a hard disk storage device 126 is configured to be 3 ms, RAID controller 124 makes an affirmative determination at block 204 if an access request requesting access to an extent stored on a hard disk storage device 126 (e.g., storage device 126a) is received at block 202 within 3 ms of another access request targeting a different extent stored on the same storage device 126a.

In response to RAID controller 124 determining at block 204 that the access request was not received in the service window of another access request serviced through the same hardware channel, the process passes to block 214, which is described below. However, in response to RAID controller 124 determining at block 204 that the access request was received in the service window of one or more previous access requests that target different extents and that are serviced through the same hardware channel, the process of FIG. 2 proceeds to block 206 and following blocks. Block 206 and following blocks illustrate RAID controller 124 recording one or more associations between the identifier of an extent targeted by the current access request and identifier(s) of the other extent(s) targeted by other memory access request(s) in the service window of the same hardware channel.

With reference now to FIG. 3, there is illustrated an exemplary access data structure 300 in which target extents of temporally proximate access requests can be recorded at block 206 of FIG. 2 in accordance with one embodiment. In the depicted example, RAID controller 124 maintains access data structure 300 in its associated controller memory 125.

In the depicted embodiment, access data structure 300, which can have the form of a table or other suitable data structure, includes a plurality of entries 302. Each entry 302 includes an extent pair field 304 for storing a pair of extent identifiers, a count field 306 for indicating a count of a number of memory access request pairs targeting the identified extents within the relevant service window, and a candidate device field 308 for identifying a candidate storage device 126 to which one of the pair of identified extents can be migrated to improve access latency.

Given this exemplary access data structure 300, at block 206 of FIG. 2 RAID controller 124 determines at block 206 whether or not access data structure 300 already includes an entry 302 recording an association between the identifier of the extent targeted by the current access request and an identifier of the target extent of the other memory access request falling in the service window of the same hardware channel. If so, RAID controller 124 can simply increment the count field 306 of the relevant entry 302, as shown at block 212. If, however, RAID controller 124 determines at block 206 that no matching entry 302 is already present within access data structure 300, RAID controller 124 allocates a new entry 302 and records in extent pair field 304 an association between the identifier of the extent targeted by the current access request and an identifier of the target extent of the other memory access request falling in the service window of the same hardware channel (block 208). In addition, RAID controller 124 determines and records in candidate device field 308 an identifier of a candidate storage device 126, if any, to which the target extent of the current access request can be migrated to reduce the latency of the target extent (block 210). In addition, RAID controller 124 increments the count value of count field 306, for example, from 0 to 1 (block 212). The process of FIG. 2 then proceeds from block 212 to block 214.

Block 214 illustrates RAID controller 124 servicing the current memory access request by providing the type of access to the target extent (e.g., read, write, open, etc.) requested by the access request. Following block 214, the process of FIG. 2 returns to block 202 and following blocks, which have been described.

FIG. 3 illustrates a specific example of how RAID controller 124 may populate access data structure 300 in one operating scenario. In this example, RAID controller 124 receives within one service window, five different memory access requests, each targeting a respective one of extents E1, . . . , E5 all stored on storage device 126a. This sequence of access requests can be represented as follows:

R1(A(E1))
R2(A(E2))
R3(A(E3))
R4(A(E4))
R5(A(E5))

In response to receiving this sequence of memory access requests, RAID controller 124 records an association between the identifiers of each pair of extents targeted by the sequence of access requests within the extent pair fields 304 of entries 302, as shown in FIG. 3. RAID controller 124 also updates the count field 306 of each such entry 302 to a value of 1, assuming that this is the first time that these extent pairs were recorded since count fields 306 were last initialized. In addition, RAID controller 124 designates candidate storage devices, if any, to which various of the target extents can be migrated to improve latency. In this example, RAID controller 124 designates storage device 126b as the candidate storage device for extent E2 via identifier B, designates storage device 126c as the candidate storage device for extent E3 via identifier C, and designates storage device 126d as the candidate storage device for extent E4 via identifier D. It should be noted that RAID controller 124 does not indicate a candidate storage device for extent E5, at least initially, since migrating extent E5 from storage device 126a would not improve overall latency if extent E5 continues to be accessed in temporal proximity to extents E2-E4.

It should be noted that after RAID controller 124 designates a candidate storage device to which one extent of an extent pair can be migrated (or refrains from making an initial designation), RAID controller 124 is preferably configured to update the designated candidate (or to make a designation of a candidate storage device) based on observed frequencies of access of various extent pairs. For example, assuming that extent E2 tends to be accessed within the same service window as extent E1 less than extent E5 is accessed within the same service window as extent E1, RAID controller 124 preferably updates the designation of the candidate storage devices in candidate storage device fields 308 to designate storage device 126b as the designated candidate for extent E5 and to clear the candidate device field 308 for the entry 302 for extent pair E1:E2.

Figure 4:
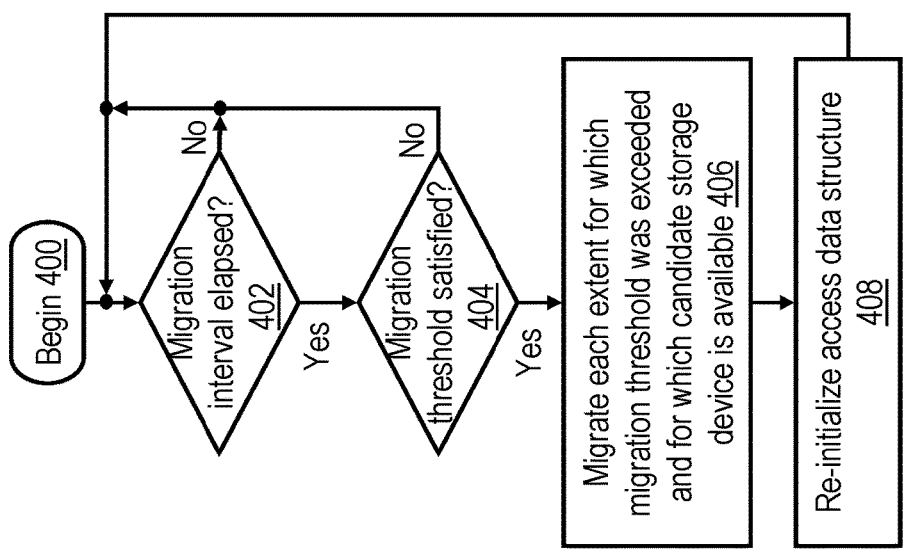
FIG. 4 is a high level logical flowchart of an exemplary process for distributing data subject to temporally proximate accesses in a data storage system in accordance with one embodiment.

Referring now to FIG. 4, there is depicted a high level logical flowchart of an exemplary process for distributing data subject to temporally proximate accesses in a data storage system in accordance with one embodiment. For ease of understanding, the process of FIG. 4 is described below with reference to RAID controller 124 migrating extents between storage devices 126; however, it should be appreciated that the process can also be applied to the distribution of data subject to temporally proximate access across other hardware channels.

The process of FIG. 4 begins at block 400 and then proceeds to block 402, which illustrates RAID controller 124 determining whether or not a minimum migration interval (e.g., 4 hours, 8 hours, 1 day, etc.) has elapsed since a migration of extents between storage devices 126 was last performed. If not, the process simply iterates at block 402. If, however, RAID controller 124 determines at block 402 that the minimum migration interval has elapsed, RAID controller 124 may optionally further determine at block 404 whether or not a count value in the count field 306 of any of (or a threshold number of) entries 302 satisfies (e.g., is greater than or equal to) a migration threshold. The optional determination illustrated at block 404 ensures that migration of extents between storage device 126 is not performed until the frequency of temporal proximity of accesses to extents is sufficient to warrant incurring the overhead of the migration process.

In response to RAID controller 124 determining at block 404 that the migration threshold has not been satisfied, the process returns to block 402. If, however, RAID controller 124 determines at block 404 that the migration threshold has been satisfied, RAID controller 124 migrates the extents between storage devices 126 in accordance with the distribution indicated by candidate device fields 308 of access data structure 300 (block 406). As a result of the migration, extents that are frequently accessed within close temporal proximity will thereafter be accessible via different hardware channels (e.g., storage devices 126). Those skilled in the art will additionally appreciate that, during the migration depicted at block 406, a storage controller, such as RAID controller 124, may additionally migrate data based on other metrics, such as extent access frequency (heat), load balancing, etc. Following the migration at block 406, RAID controller 124 re-initializes access data structure 300, for example, by clearing extent pair fields 304 and candidate device fields 308 and resetting count fields 306 to zero (block 408). The process then returns to block 402, which has been described.

As has been described, in at least one embodiment, a data storage system includes at least first and second storage devices accessed via first and second hardware channels, respectively. A storage controller of the data storage system receives a first access request requesting access to first data and a second access request requesting access to second data, where both the first data and the second data are accessed via the first hardware channel. In response to detecting receipt of the first and second access requests within a same service window defining a range of temporal proximity, the storage controller records an association of identifiers of the first data and second data requested by the first and second access requests, respectively. The storage controller thereafter migrates the second data accessed by the second access request from the first storage device to the second storage device based on the recorded association, such that the first and second data are available for access via different hardware channels.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude signal media per se, transitory propagating signals per se, and energy per se.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:

1. A method of managing data migration in a data storage system including at least first and second storage devices accessed via first and second hardware channels, respectively, the method comprising:
a storage controller of the data storage system receiving a first access request requesting access to first data and a second access request requesting access to second data, wherein both the first data and the second data are accessed via the first hardware channel;
in response to detecting receipt of the first and second access requests within a same service window defining a range of temporal proximity, the storage controller recording an association of identifiers of the first data and second data requested by the first and second access requests as an access pair in an access data structure, wherein the access data structure tracks a number of occurrences the access pair of the first and second access requests were detected within the same service window; and
the storage controller thereafter periodically analyzes the access data structure, and determines to migrate the second data accessed by the second access request from the first storage device to a candidate storage device based on the recorded association when the number of occurrences for the access pair in the access data structure exceeds a migration threshold; and
the storage controller, in response to determining to migrate the second data, migrating the second data from the first storage device to the candidate storage device, such that the first and second data are available for access via different hardware channels.

2. The method of claim 1, wherein: the first hardware channel has an access latency; and the service window is at least equal in duration to the access latency of the first hardware channel.

3. The method of claim 1, wherein: the service window is at least equal in duration to a seek time of the first storage device.

4. The method of claim 1, wherein the recording includes: recording an identifier of the second storage device in the access data structure as the candidate storage device to which the second data can be migrated.

5. The method of claim 4, and further comprising: updating the candidate storage device to which the second data can be migrated based on access frequency of at least one of a set including the first data and the second data.

6. A data storage system, comprising:
a storage controller configured to perform:
the storage controller receiving a first access request requesting access to first data and a second access request requesting access to second data, wherein both the first data and the second data are accessed via a first hardware channel;
in response to detecting receipt of the first and second access requests within a same service window defining a range of temporal proximity, the storage controller recording an association of identifiers of the first data and second data requested by the first and second access requests as an access pair in an access data structure, wherein the access data structure tracks a number of occurrences the access pair of the first and second access requests were detected within the same service window; and
the storage controller thereafter periodically analyzes the access data structure, and determines to migrate the second data accessed by the second access request from the first storage device to a candidate storage device based on the recorded association when the number of occurrences for the access pair in the access data structure exceeds a migration threshold; and
the storage controller, in response to determining to migrate the second data, migrating the second data from the first storage device to the candidate storage device, such that the first and second data are available for access via different hardware channels.

7. The data storage system of claim 6, wherein: the first hardware channel has an access latency; and the service window is at least equal in duration to the access latency of the first hardware channel.

8. The data storage system of claim 6, wherein: the service window is at least equal in duration to a seek time of the first storage device.

9. The data storage system of claim 6, wherein the recording includes: recording an identifier of the second storage device in the access data structure as the candidate storage device to which the second data can be migrated.

10. The data storage system of claim 9, wherein the storage controller is further configured to perform: updating the candidate storage device to which the second data can be migrated based on access frequency of at least one of a set including the first data and the second data.

11. The data storage system of claim 6, and further comprising the first and second storage devices.

12. A computer program product, the computer program product comprising a non-transitory computer readable storage medium having program instructions embodied therewith, the program instructions executable by a storage controller to cause the storage controller to perform:

the storage controller receiving a first access request requesting access to first data and a second access request requesting access to second data, wherein both the first data and the second data are accessed via a first hardware channel;

in response to detecting receipt of the first and second access requests within a same service window defining a range of temporal proximity, the storage controller recording an association of identifiers of the first data and second data requested by the first and second access requests as an access pair in an access data structure, wherein the access data structure tracks a number of occurrences the access pair of the first and second access requests were detected within the same service window; and the storage controller thereafter periodically analyzes the access data structure, and determines to migrate the second data accessed by the second access request from the first storage device to a candidate storage device based on the recorded association when the number of occurrences for the access pair in the access data structure exceeds a migration threshold; and the storage controller, in response to determining to migrate the second data, migrating the second data from the first storage device to the candidate storage device, such that the first and second data are available for access via different hardware channels.

13. The computer program product of claim 12, wherein: the first hardware channel has an access latency; and the service window is at least equal in duration to the access latency of the first hardware channel.

14. The computer program product of claim 12, wherein: the service window is at least equal in duration to a seek time of the first storage device.

15. The computer program product of claim 12, wherein the recording includes: recording an identifier of the second storage device in the access data structure as the candidate storage device to which the second data can be migrated.

16. The computer program product of claim 15, wherein the program instructions further cause the storage controller to perform: updating the candidate storage device to which the second data can be migrated based on access frequency of at least one of a set including the first data and the second data.

\* \* \* \* \*